United States Patent
Tobias et al.

(10) Patent No.: US 11,357,212 B1
(45) Date of Patent: Jun. 14, 2022

(54) PET DOOR ALERT SYSTEM

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

(*) Notice: Subject to any disclaimer, the term of this patent is extended or adjusted under 35 U.S.C. 154(b) by 0 days.

(21) Appl. No.: 17/585,688

(22) Filed: Jan. 27, 2022

Related U.S. Application Data

(60) Provisional application No. 63/238,286, filed on Aug. 30, 2021.

(51) Int. Cl.
| | | |
|---|---|---|
| *A01K 15/02* | (2006.01) | |
| *A01K 11/00* | (2006.01) | |
| *G08B 7/06* | (2006.01) | |
| *A01K 27/00* | (2006.01) | |
| *A01K 29/00* | (2006.01) | |

(52) U.S. Cl.
CPC .......... *A01K 15/023* (2013.01); *A01K 11/006* (2013.01); *A01K 27/001* (2013.01); *A01K 27/009* (2013.01); *A01K 29/005* (2013.01); *G08B 7/06* (2013.01)

(58) Field of Classification Search
CPC ...... A01K 1/035; A01K 15/02; A01K 15/023; A01K 27/009; A01K 11/006; A01K 27/001; A01K 29/005; A01K 15/021; A01K 15/04
USPC .... 119/721, 720, 719, 712, 859, 51.02, 421, 119/718, 908; 340/573.3, 573.1
See application file for complete search history.

(56) References Cited

U.S. PATENT DOCUMENTS

| | | | | |
|---|---|---|---|---|
| 5,475,369 A | * | 12/1995 | Baker | A01K 15/02 340/286.11 |
| 5,952,926 A | * | 9/1999 | Syverson | A01K 1/035 340/286.11 |
| 6,433,692 B1 | * | 8/2002 | Kenum | A01K 1/035 340/573.3 |
| 6,944,990 B2 | * | 9/2005 | Noyes | E06B 7/32 49/169 |
| 7,511,626 B2 | * | 3/2009 | Siegmann | B66B 1/468 119/843 |
| 10,920,484 B2 | * | 2/2021 | Miller | E05F 15/76 |
| 2005/0161000 A1 | * | 7/2005 | Noyes | A01K 1/035 119/484 |
| 2005/0284402 A1 | * | 12/2005 | Becker | E06B 7/32 119/484 |

(Continued)

*Primary Examiner* — Yvonne R Abbott-Lewis
(74) *Attorney, Agent, or Firm* — Jeffrey A. Proehl; Woods, Fuller, Shultz & Smith, PC

(57) ABSTRACT

A system for notifying occupants of a structure that a pet is proximate to an opening of a structure. The system may include a pet unit wearable on the pet's body and including a transmitter configured to transmit a wireless proximity signal from the pet unit. The system may further include an exit unit positionable at an exit of the structure. The exit unit may include a receiver configured to receive a said wireless proximity signal transmitted by a pet unit, with the receiver being configured to produce an alert signal when a said wireless proximity signal is received. The exit unit my also include an alerting assembly configured to provide a presence alert when the receiver receives a said wireless proximity signal. T alerting assembly may comprise a perceptible alerting mechanism configured to produce a perceptible presence alert which is perceptible to a sense of a human.

19 Claims, 3 Drawing Sheets

(56) References Cited

U.S. PATENT DOCUMENTS

| | | | |
|---|---|---|---|
| 2006/0180094 A1* | 8/2006 | Viggiano | A01K 15/023 |
| | | | 119/721 |
| 2008/0072843 A1* | 3/2008 | Malacarne | E06B 7/32 |
| | | | 119/719 |
| 2008/0184940 A1* | 8/2008 | Bosserdet | E06B 7/32 |
| | | | 49/58 |
| 2009/0044760 A1* | 2/2009 | Kodat | A01K 15/02 |
| | | | 340/572.1 |
| 2010/0116219 A1* | 5/2010 | Noyes | E06B 7/32 |
| | | | 49/70 |
| 2010/0242854 A1* | 9/2010 | Seger | E06B 7/32 |
| | | | 119/484 |

* cited by examiner

PET DOOR ALERT SYSTEM

REFERENCE TO RELATED APPLICATIONS

This application claims the priority benefit of U.S. Provisional Patent No. 63/238,286, filed Aug. 30, 2021, which is hereby incorporated by reference in its entirety

BACKGROUND

Field

The present disclosure relates to pet monitoring systems and more particularly pertains to a new pet door alert system for alerting a pet owner for the pet's proximity to a door of a building to leave the building.

Description of the Prior Art

Pets often need to leave the inner confines of a house for various purposes, including exercise and to relieve themselves. Such excursions inevitably lead to the pet needing to pass through a door of the house, and requires that the pet owner recognize that the pet is waiting at (or approaching) a door of the house for exit. Pet owners have recognized that it is not always easy to recognize when their pets are waiting at the door to leave the house. Some dogs may bark, but the owner must be close enough to the door to hear the bark, while other dogs may not bark at all.

Various devices have been proposed and implemented that sense motion near a door and sound an alarm, however, typically the sensor of such devices has a field of view that is too wide and/or deep for this particular usage, and may produce false alarms which may lead to the pet owner ignoring of the alarm.

SUMMARY

The present disclosure relates to a system for notifying occupants of a structure that a pet is proximate to an exit of the structure. The system may comprise a pet unit that is wearable on the body of the pet and may include a transmitter configured to transmit a wireless proximity signal from the pet unit. The system may further include an exit unit positionable at the exit of the structure. The exit unit may include a receiver configured to receive a said wireless proximity signal transmitted by a said pet unit, with the receiver being configured to produce an alert signal when a said wireless proximity signal is received. The exit unit may further include an alerting assembly configured to provide a presence alert when the receiver receives a said wireless proximity signal. The alerting assembly may comprise a perceptible alerting mechanism configured to produce a perceptible presence alert which is perceptible to a sense of a human.

In another aspect, the disclosure relates to a system for notifying occupants of a structure that a pet is proximate to an exit of the structure. The system may comprise an exit unit positionable at the exit of the structure. The exit unit may include an emitter configured to emit radiation outwardly from the exit unit, and the emitter being configured to emit the radiation from the exit unit in free air. The exit unit may also comprise a detector configured to receive a reflection of the radiation emission of the emitter, and the detector may be configured to produce an alert signal when a said reflection is detected. The exit unit may further comprise an alerting assembly configured to provide a presence alert when the detector detects a reflection, and the alerting assembly may comprise a perceptible alerting mechanism configured to produce a perceptible presence alert which is perceptible to a sense of a human. The system may further include a pet unit wearable on the body of the pet, and the pet unit may include a reflector element configured to reflect radiation emitted from the emitter when the radiation reaches the reflector element.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
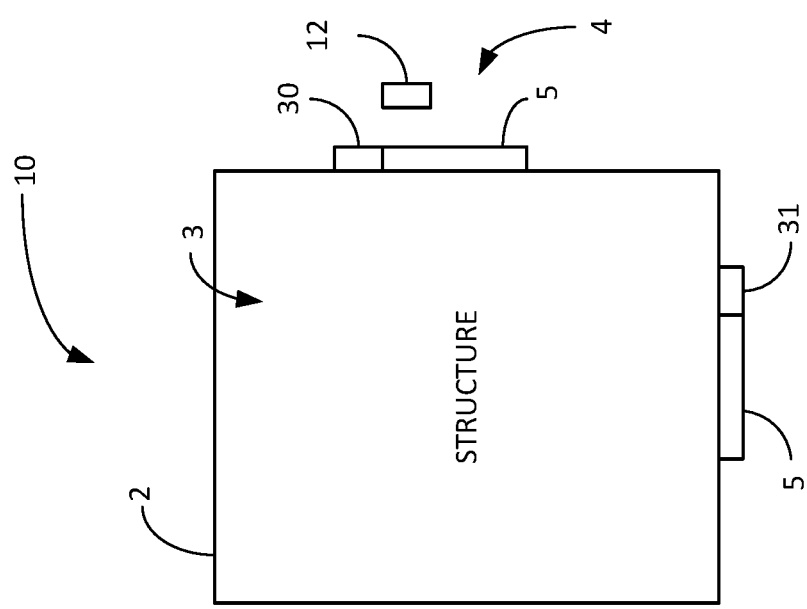
FIG. 1 is a schematic diagram of elements of a new pet door alert system according to the present disclosure.
Figure 2:
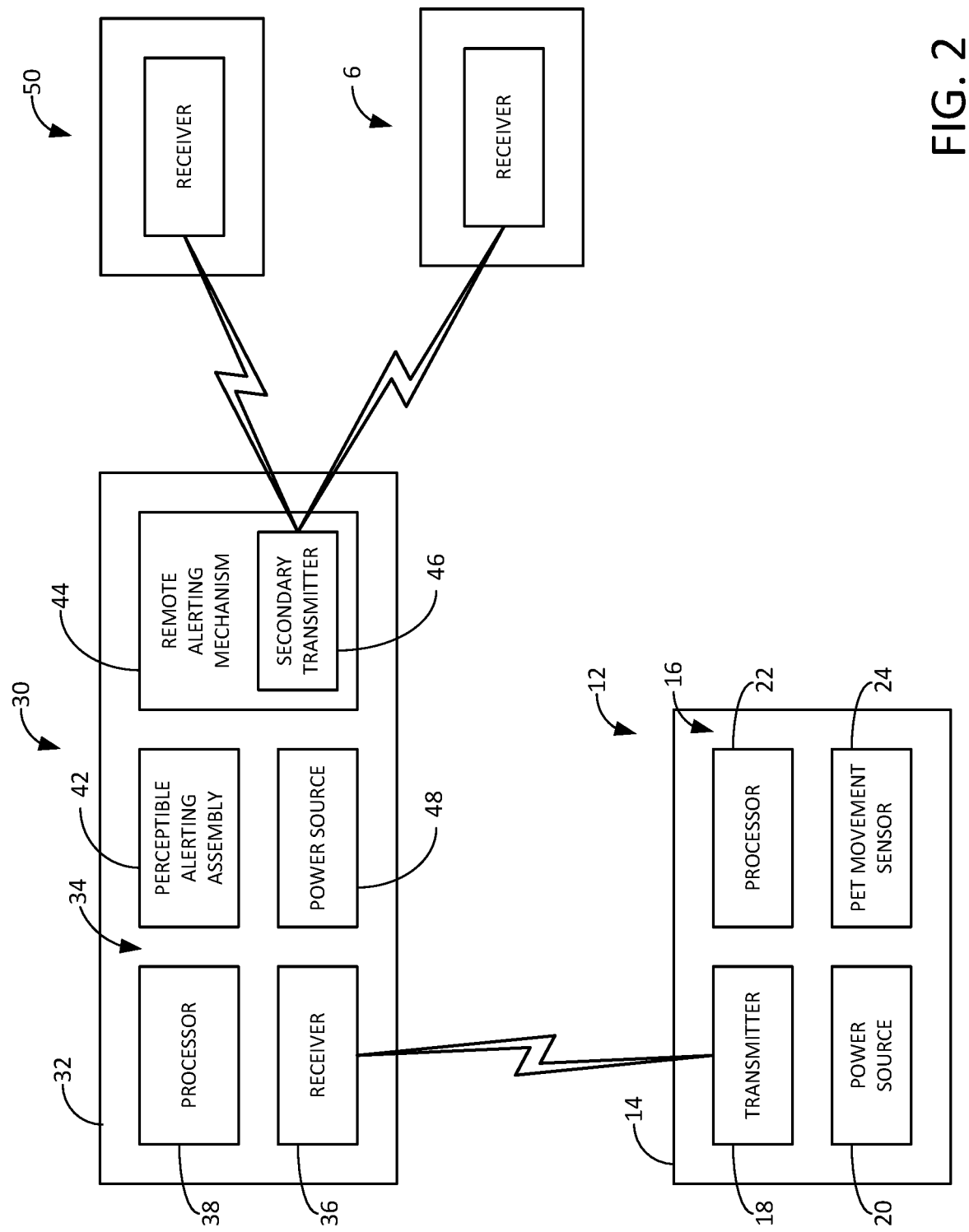
FIG. 2 is a schematic diagram of some of the elements of the pet door alert system shown in greater detail, according to an illustrative embodiment.
Figure 3:
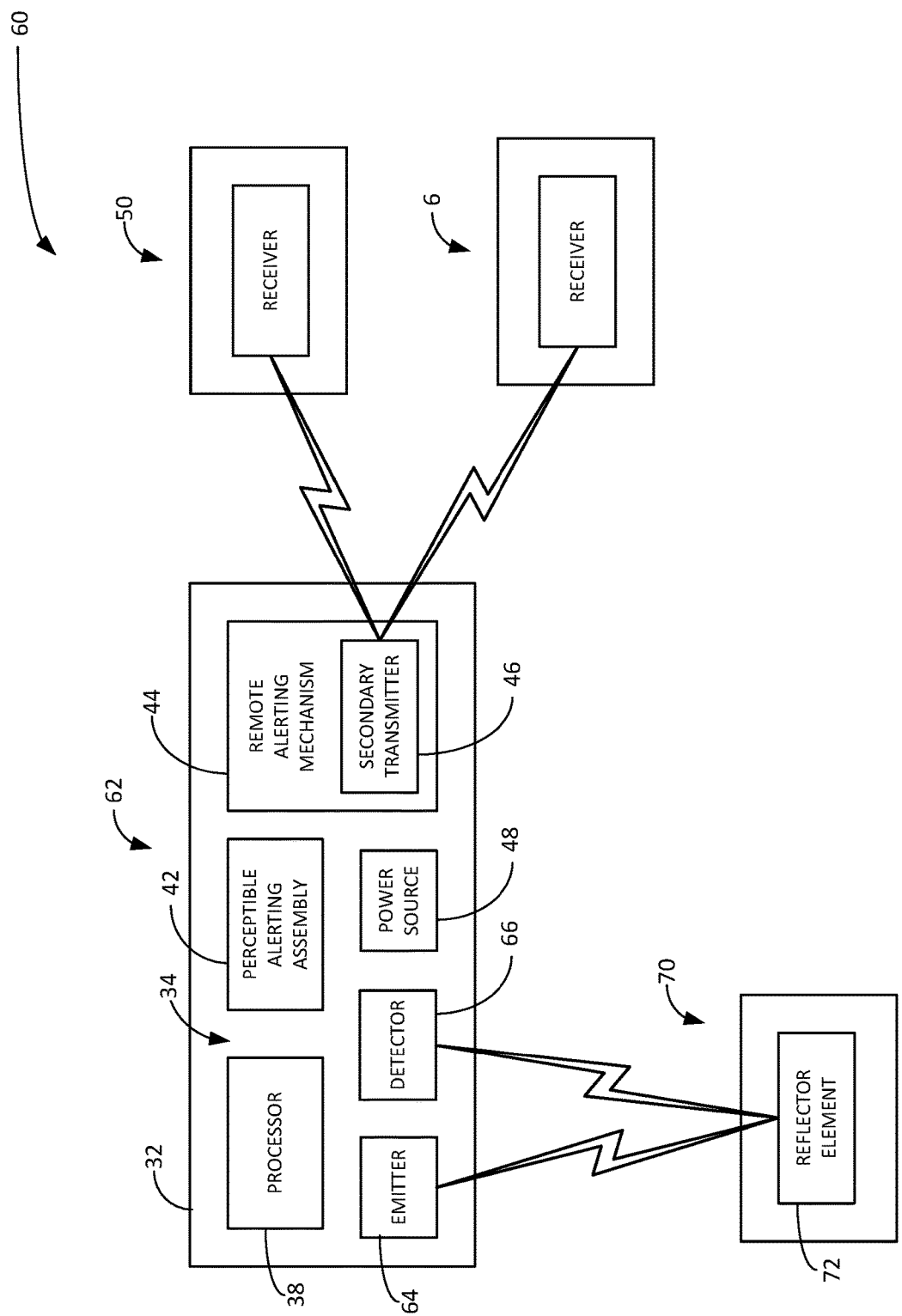
FIG. 3 is a schematic diagram of element of another illustrative embodiment of the pet door alert system.

With reference now to the drawings, and in particular to FIGS. 1 through 3 thereof, a new pet door alert system embodying the principles and concepts of the disclosed subject matter will be described.

In some aspects, the disclosure relates to a system 10 for notifying a person of persons that a pet is desirous of exit from a structure 2, such as when the pet approaches a door of the structure with the intention of exiting the structure, typically so that the door may be opened to permit the pet to exit the structure. Additionally, the system 10 may be useful for situations where the pet desires to enter the structure after spending time outdoors. The person notified by the system 10 may be an occupant of the structure 2, but in some implementations the person or persons may be remote from the exit of the structure, and even the structure itself. The structure 2 may comprise a building, such as a residential home, and may define an interior 3 and an exterior 4 outside of the building, and have an exit 5 between the exterior and the interior. The exit 5 may comprise an opening between the interior and exterior, and a closure device configured to selectively close the opening of the exit, such as a door with an open condition characterized by the closure device permitting passage of the pet through the opening of the exit, and a closed condition characterized by the closure device preventing passage of the pet through the opening of the exit.

In general, the system 10 may include a pet unit 12 movable with the pet and one or more exit units 30 with each unit 30 being associated with a location on the structure 2 such as an exit 5 of the structure. The exit unit or units may be positioned on the interior of the structure for sensing the approach of a pet to the exit on the interior side of the exit for the purpose of leaving the interior, and/or may be positioned on the exterior of the structure for sensing the approach of a pet to the exit (or entrance) on the exterior side of the exit for the purpose of entering the interior. Movement of the pet unit 12 into proximity of an exit unit 30 may cause the exit unit to produce a local and/or remote alert of the pet's proximity to the unit 30 and, often, an exit of the structure.

In greater detail, the pet unit 12 may be in a form and size that is readily carriable or wearable or otherwise positionable on the body of the pet. In some embodiments, the pet unit 12 may be mountable on a pet collar, such as by means of a clip that removably receives a portion of the collar, or in some embodiments, may be more permanently integrated into a pet collar such that the unit is not removable from the collar. The pet unit 12 may comprise a case 14 for enclosing elements of the unit 12, and the case may have an interior 16 for receiving the elements. The case 14 may also include means for mounting the pet unit on a pet collar, such as, for example, a clip or a loop, and may include a single element or multiple elements.

The pet unit 12 may also include a transmitter 18 which is configured to transmit a wireless proximity signal in an area about the case 14, and thus in an area about a pet wearing the pet unit.

The range of the transmission of the proximity signal may be limited in effective signal strength. In some embodiments, the range may be limited to an area with a diameter of less than approximately 10 feet, and may be less than approximately 5 feet, or even less than approximately 3 feet, so as to permit the system to more accurately identify the exit unit to which the pet unit is proximate. In some of the most highly preferred implementations of the system 10, the transmission of the wireless proximity signal may be in the form of an infrared (IR) signal, which is highly suitable for providing a proximity signal with controlled or limited range which reduces the opportunity for "false" alarms by the system 10. Other transmission forms, such as radiofrequency (RF) signals may be less controllable in range and also may be more susceptible to signal interference, which may increase the possibility of false alarms and may also decrease the ability to receive the proximity signal for producing legitimate alarms. The transmitter 18 may be mounted on the case 14, and may be protectively positioned in the interior 16 of the case.

The pet unit 12 may further include a power source 20 which is configured to provide power to elements of the pet unit 12, such as the transmitter 18. The power source 20 may be positioned on the case 14, and may be protectively positioned in the interior 16 of the case. In some embodiments, the power source 20 may comprise a rechargeable battery or a replaceable battery that may be interchangeably mounted on the case interior 16.

The pet unit 12 may still further include a processor 22 which may be mounted on the case 14, and may be positioned in the case interior 16. The processor 22 may be configured to cause the transmitter 18 to transmit the proximity signal. The processor 22 may be configured to cause the transmitter to transmit the proximity signal at a selected interval in between transmissions to minimize the power expended by the transmitter of the pet unit to produce the proximity signal. Illustratively, the selected interval may be preselected, and/or may be selectable by a user of the system 1 to optimize the relative promptness with which the presence of the pet unit to the exit unit is detectable. In some implementations, the processor 22 may be configured to cause the transmitter 18 to transmit the proximity signal with a pet identification code assigned to the pet unit associated with the transmitter for the purpose of identifying the pet unit (and the pet wearing the pet unit) transmitting the proximity signal. Each of the pet units 12 of the system may thus be assigned a pet identification code which is unique in the system.

In some embodiments of the pet unit 12, a pet movement sensor 24 may be included to detect movement of the pet associated with the pet unit. The pet movement sensor 24 may be mounted on the case 14, such as in the case interior 16. The pet movement sensor 24 may be configured to generate a movement signal when movement of the pet unit 12 is sensed, and the pet movement sensor may provide the movement signal to the processor 22, such as an input for the processor to use to determine if the proximity signal should be transmitted at a particular time such as when the per is determined to be moving. Illustratively, the pet movement sensor 24 may comprise an accelerometer, although other device capable of detecting motion may also be utilized.

The exit unit 30 of the system 10 may be positionable at or adjacent to an exit 5 of the building, and optionally the system 10 may include a plurality of exit units 30, 31 with each unit being positionable at a unique one of the exits of the building. Each exit unit 30 may comprise a housing 32, and the housing may define a housing interior 34 for receiving elements of the exit unit. The housing 32 may be configured to be mounted on the structure adjacent to an exit, and the housing may have means for mounting the housing of the exit unit on a building such as, for example, with fasteners or adhesive components.

Each exit unit 30, 31 may also include a receiver 36 which is configured to receive a wireless proximity signal transmitted by a pet unit 12. The receiver 36 may be configured to produce an alert signal when a proximity signal has been received. Illustratively, the receiver 36 may be configured to receive an IR proximity signal transmitted by the transmitter 18 of the pet unit 12. The receiver 36 may also be configured to receive, and in some implementations derive, the pet identification code from a proximity signal received by the receiver. Each exit unit 30, 31 may also include a processor 38 configured to receive the pet identification code associated with the proximity signal received by the receiver to identify the pet unit, and the processor may also receive from the receiver notification of the receipt of the proximity signal by the receiver 36, and may produce the alert signal. The processor 38 may be configured to compare the pet identification code received by the receiver 36 with a list of identified pet identification codes to identify the particular pet unit transmitting the proximity signal. Storage may be associated with the processor 38 to retain the pet identification codes and associated information such that the identification information may be provided to a user via the alerting assembly 40 described herein. The processor 38 may also be configured to log temporal information associated with the received proximity signal, such as, for example, a time and date of reception of the proximity signal, as well as other information such as the pet identification code.

Each exit unit 30, 31 may further comprise an alerting assembly 40 that is configured to provide a presence alert when the receiver 38 receives a wireless proximity signal, and in some implementations the presence alert may also identify the particular exit unit producing the proximity alert. The presence alert provided by the alerting assembly 40 may also include an exit identification code to identify the particular exit unit with which the presence alert is associated, such as which exit unit received the proximity signal. Each of the exit units 30, 31 of the system 10 may have a unique exit identification code.

The alerting assembly 40 may comprise a perceptible alerting mechanism 42 which may be configured to produce a presence alert which is a perceptible presence alert which is perceptible to a sense of a human. For example, the perceptible alerting mechanism 42 may be configured to produce a presence alert which is auditory so as to be able to be sensed by ears of a human. In another example, the perceptible alerting mechanism 42 may be configured to produce a presence alert which is visual so as to be able to be sensed by eyes of a human. In yet another example, the perceptible alerting mechanism 42 may be configured to produce a presence alert which is tactile so as to be able to be sensed by the skin of a human.

The alerting assembly may comprise a remote alerting mechanism 44 which may be configured to produce a remote presence alert signal which is receivable remotely from the exit unit 30. The remote alerting mechanism 44 may wirelessly transmit the remote presence alert signal using any suitable communication protocol and technology, and may transmit using, for example, the Bluetooth low energy (BLE) protocol. In some implementations, the remote presence alert signal transmitted by the alerting mechanism may be configured to be received by an information handling device 6. The information handling device 6 may be configured to provide the remote alert signal to an application program resident on the information handling device, via communications circuitry typically provided on a device, such as a radio receiver capable of receiving BLE signals. The information handling device 6 may include a so-called "smart" cellular telephone with processing capabilities in addition to communication capabilities, or a desktop or laptop portable computer with suitable communication circuitry. In some embodiments, the remote alerting mechanism 44 may include a secondary transmitter 46 that is configured to transmit the remote presence alert signal and may also be configured to transmit the exit identification code for the exit unit 30 with the remote presence alert signal.

The exit unit 30 may also include a power source 48 configured to provide power to elements of the exit unit. The power source 48 may be positioned on the housing 32 and may comprise a battery, such as a rechargeable battery, but may also comprise a power cord configured to interface with an electrical power outlet of the structural wiring of the building.

In some embodiments, the system 10 may also include a remote unit 50 which is configured to provide a perceptible remote alert at a location that is remote from the exit unit receiving a proximity signal. For example, the exit unit 30 may be positioned on the exterior of the building adjacent to the exit opening, or in the building interior adjacent to the exit, which may not be the most effective location for providing a broad range or reach for sensing the perceptible presence alert. The remote unit 50 may have similar elements to the exit unit 30 so that the remote unit is able to emulate some functions of the exit unit. For example, the remote unit 50 may include a remote housing freely positionable with respect to the exit unit 30, a remote receiver for receiving the remote presence alert signal produced by the remote alerting mechanism 44 of the exit unit, a remote alerting assembly configured to provide a perceptible alert in the space about the remote housing, and a remote power supply configured to provide power to elements of the remote unit. Additional elements may also be provided, such as, for example, a remote processor.

In another illustrative embodiment 60, such as is depicted in FIG. 3, an exit unit 62 of the embodiment may include an emitter 64 that is configured to emit radiation outwardly from the exit unit, and may emit the radiation from the exit unit in free air. The emitter 64 may be mounted on the housing of the exit unit. In some of the most preferred embodiments, the emitter 64 may be configured to emit infrared (IR) radiation, and the IR emitter may be configured to emit IR radiation having a wavelength of approximately 940 nm, although other suitable IR wavelengths may be utilized. The exit unit 62 may also include a detector 66 which is configured to receive and detect a reflection of the radiation emitted by the emitter. The detector 66 may be mounted on the housing of the exit unit, and upon detection of reflected radiation, the detector may be configured to produce an alert signal. In some embodiments, the detector 66 may be configured to detect a reflection of the radiation emission which has reflected off an object within a specific distance or proximity to the exit unit.

The embodiment 60 may also include a pet unit 70 to be associated with the pet, and the pet unit may have a reflector element 72 which may be configured to reflect radiation emitted from the emitter 64 when the radiation reaches the reflector element, so that a portion of the reflected radiation may be detected by the detector 66. The reflector element 72 may have a reflective surface which may be reflective to the radiation emitted by the emitter, so that waves of the emitter radiation striking the reflective surface may be reflected outwardly from the surface and, to some degree, back toward the exit unit and the detector. The reflective surface may be formed on a surface associated, or associable, with a pet, such as an item easily worn by the pet. In some implementations, the reflective surface may be formed on a pet collar, and illustratively the reflective surface is formed on a length of tape, with the reflective surface forming one side of the tape, and the tape may be attached to the pet collar (or other pet accoutrement) by any suitable technique, such as by adhering using adhesive. Other elements of the system 10 described herein may also be utilized in the embodiment 60 as is suitable and desirable. Those skilled in the art, having the benefit of this disclosure, will recognize that the system 10 may also be used for recognizing the need for the pet to reenter the structure through the door, and the system 10 may be adapted by simply positioning the exit unit on the exterior of the structure adjacent the exit opening in the building so as to sense a pet proximate to the exterior side of the door.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for notifying occupants of a structure that a pet is proximate to an exit of the structure, the system comprising:
   a pet unit wearable on the body of the pet, the pet unit including a transmitter configured to transmit a wireless proximity signal from the pet unit; and
   an exit unit positionable at the exit of the structure, the exit unit including:
      a receiver configured to receive a said wireless proximity signal transmitted by a said pet unit, the receiver being configured to produce an alert signal when a said wireless proximity signal is received; and
      an alerting assembly configured to provide a presence alert when the receiver receives a said wireless proximity signal;
      wherein the alerting assembly comprises a perceptible alerting mechanism configured to produce a perceptible presence alert which is perceptible to a sense of a human.

2. The system of claim 1 wherein the wireless proximity signal comprises an infrared (IR) signal.

3. The system of claim 2 wherein the receiver of the exit unit is configured to receive the IR signal transmitted by the transmitter of the pet unit.

4. The system of claim 1 wherein the pet unit is mounted on a pet collar for being worn by a pet.

5. The system of claim 1 wherein the pet unit comprises a processor configured to cause the transmitter to transmit the proximity signal.

6. The system of claim 5 wherein the processor is configured to cause the transmitter to transmit the proximity signal at a selected interval in between transmissions of the proximity signal.

7. The system of claim 5 wherein the processor is configured to cause the transmitter to transmit the proximity signal with a pet identification code of the pet unit to identify the pet unit with which the proximity signal is associated, the pet identification code being unique to the pet unit on the system.

8. The system of claim 7 wherein the exit unit additionally includes a processor configured to receive the pet identification code associated with the proximity signal received by the receiver to identify the pet unit.

9. The system of claim 8 wherein the processor is configured to compare the received pet identification code with a list of identified pet identification codes to identify the pet unit transmitting the proximity signal.

10. The system of claim 9 wherein the alerting mechanism is configured to produce a said presence alert identifying a said exit unit producing the proximity alert.

11. The system of claim 9 wherein the alerting mechanism comprises a remote alerting mechanism configured to produce a remote presence alert signal which is receivable remotely from the exit unit, the remote alerting mechanism wirelessly being configured to transmit the remote presence alert signal.

12. The system of claim 11 wherein the remote alerting mechanism includes a secondary transmitter configured to transmit the remote presence alert signal.

13. The system of claim 8 wherein the processor is configured to log temporal information associated with the received proximity signal.

14. The system of claim 1 wherein the pet unit comprises a pet movement sensor configured to detect movement of the pet associated with the pet unit, the pet movement sensor being configured to generate a movement signal when movement of the pet unit is sensed and provide the movement signal to the processor.

15. The system of claim 14 wherein the receiver of the exit unit is configured to derive the pet identification code from a said wireless proximity signal received by the receiver.

16. The system of claim 1 wherein the pet unit comprises:
   a case, the transmitter being mounted on the case; and
   a power source configured to provide power to elements of the pet unit.

17. The system of claim 1 additionally comprising a remote unit configured to provide a perceptible remote alert at a location remote from a said exit unit when the remote unit receives a said proximity signal.

18. A system for notifying occupants of a structure that a pet is proximate to an exit of the structure, the system comprising:
   an exit unit positionable at the exit of the structure, the exit unit including:
      an emitter configured to emit radiation outwardly from the exit unit, the emitter being configured to emit the radiation from the exit unit in free air;

a detector configured to receive a reflection of the radiation emission of the emitter, the detector being configured to produce an alert signal when a said reflection is detected; and an alerting assembly configured to provide a presence alert when the detector detects a said reflection, the alerting assembly comprising a perceptible alerting mechanism configured to produce a perceptible presence alert which is perceptible to a sense of a human; and a pet unit wearable on the body of the pet, the pet unit including a reflector element configured to reflect radiation emitted from the emitter when the radiation reaches the reflector element.

19. The system of claim 18 wherein the reflector element has a reflective surface, the reflective surface being reflective to the radiation emitted by the emitter.

\* \* \* \* \*